United States Patent [19]

Stallings, Jr. et al.

[11] Patent Number: 5,018,688
[45] Date of Patent: May 28, 1991

[54] PASSIVE VENTING TECHNIQUE FOR SHALLOW CAVITIES

[75] Inventors: Robert L. Stallings, Jr., Yorktown; Floyd J. Wilcox, Jr., Hampton, both of Va.

[73] Assignee: The United States of America as represented by the Administrator of the National Aeronautics, Washington, D.C.

[21] Appl. No.: 250,468

[22] Filed: Sep. 28, 1988

[51] Int. Cl.⁵ .................. B64C 7/00; B64D 1/02
[52] U.S. Cl. .................. 244/137.4; 244/118.1; 244/130
[58] Field of Search ........... 244/137.1, 137.4, 118.1, 244/198, 207–209, 130; 89/1.51, 1.54

[56] References Cited

U.S. PATENT DOCUMENTS

| | | | |
|---|---|---|---|
| 2,791,387 | 5/1957 | Weinberg | 244/137.1 |
| 4,522,360 | 6/1985 | Barnwell et al. | 244/130 |
| 4,524,670 | 6/1985 | Billard et al. | 89/1.51 |
| 4,703,904 | 11/1987 | Haslund | 244/130 |
| 4,781,342 | 11/1988 | Hardy et al. | 244/137.4 |

*Primary Examiner*—Galen Barefoot
*Attorney, Agent, or Firm*—George F. Helfrich; John R. Manning; Charles E. B. Glenn

[57] ABSTRACT

A device for reducing drag and store separation difficulties caused by shallow cavities on aircraft in supersonic flight consisting of a slab of porous material cut to fit precisely inside the cavity. This slab is mounted inside the cavity such that a plenum chamber is formed between the slab and the floor of the cavity. This device allows air to flow through the chamber opposite to the direction of flow outside the chamber. This results in reduced drag and improved store separation characteristics.

2 Claims, 4 Drawing Sheets

PASSIVE VENTING TECHNIQUE FOR SHALLOW CAVITIES

ORIGIN OF THE INVENTION

The invention described herein was made by employees of the United States Government and may be manufactured and used by or for the Government for governmental purposes without the payment of any royalties thereon or therefor.

CROSS REFERENCE TO RELATED APPLICATION

This application is related to our copending application Ser. No. 07/252081, filed Sept. 30, 1988 entitled "Passive Venting Technique for Shallow Cavities".

TECHNICAL FIELD OF THE INVENTION

The present invention relates in general to shallow cavities on aircraft (for example, bomb and missile bays) and in particular to a device for reduction of drag and store separation difficulties caused by shallow cavities through the use of a porous material in the floor of the shallow cavity.

BACKGROUND OF THE INVENTION

During supersonic flight, cavities on aircraft affect the airflow across the surface of the aircraft depending on the length to height ratio of the cavity. If the length to height ratio is greater than about 12, the cavity is a shallow cavity and the airflow around the cavity is "closed cavity flow". If it is less than about 12, it is a deep cavity and the airflow is "open cavity flow". Although test results show that a length to height ratio of 12 is the approximate boundary between closed cavity and open cavity flow, this invention is also beneficial for length to height ratios between 9 and 12.

One difference between the two types of cavity flowfields is the pressure regions formed at the ends of the cavity in supersonic flight. A low pressure region is formed at the front of the cavity and a high pressure region is formed at the rear. In shallow cavities, these pressure areas are separated by a large enough distance that the high pressure region cannot vent to the low pressure region. This results in a large difference in the pressure level between the two regions and leads to increased drag and to difficulty in separating stores (bombs or missiles) from the cavity.

These problems are not characteristic of deep cavities which demonstrate "open cavity flow". In deep cavities, the airflow is essentially undisturbed over the cavity. This is because the high and low pressure areas are not separated by a large distance and the pressure is essentially the same along the floor of the cavity. This means that the cavity causes very little drag and that there is no difficulty in separating stores from the cavity.

Because it is not feasible for all cavities on aircraft to be deep cavities due to space and size limitations, the following are objects of the present invention.

An object of the present invention is to provide a device to cause shallow cavities on aircraft to behave like deep cavities during supersonic flight.

Accordingly, an object of the present invention is to provide a device which will cause the air in the high pressure region at the rear of a shallow cavity to be vented to the low pressure region in the front of the cavity.

SUMMARY OF THE INVENTION

According to the present invention, the foregoing and additional objects are obtained by providing a slab of porous material which is positioned a small distance above the floor of a shallow cavity on an aircraft. The slab of porous material has the same measurements as the inside of the cavity and may be modified slightly depending on the means used to mount the slab inside the cavity. Any means may be used to mount the slab as long as airflow through the plenum chamber between the porous slab and the floor of the cavity is not blocked. The slab is most useful for porosities between 4 and 25%. The plenum chamber must be deep enough to allow air to flow freely through the chamber. The plenum chamber should be as shallow as possible so that stores may be mounted within the cavity. Any means which will allow release of the stores may be used to mount the stores. A deep plenum chamber does not affect the usefulness of this invention. A shallow cavity is one with a length to height ratio greater than 12 although some beneficial results occur in cavities with a length to height ratio between 9 and 12. The porous material allows air to flow from the high pressure region at the rear of the cavity to the low pressure region at the front of the cavity. These high and low pressure regions are produced during supersonic flight.

DETAILED DESCRIPTION OF THE INVENTION

Figure 1:
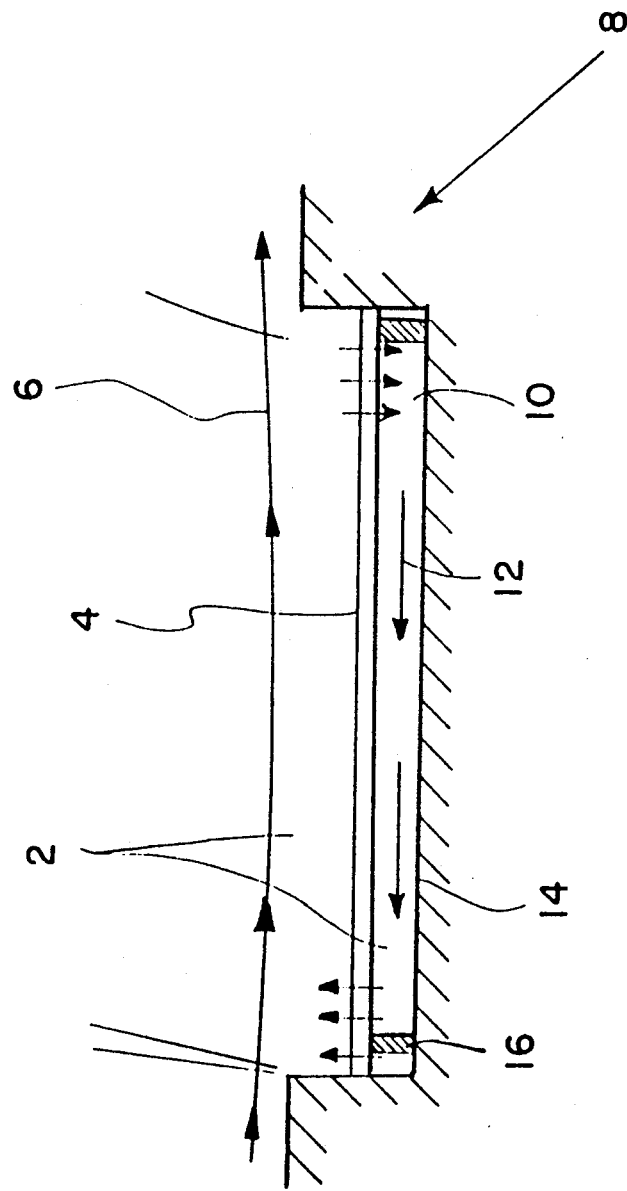
FIG. 1 is a side view of a porous slab mounted inside a cavity forming a plenum chamber.
Figure 2:
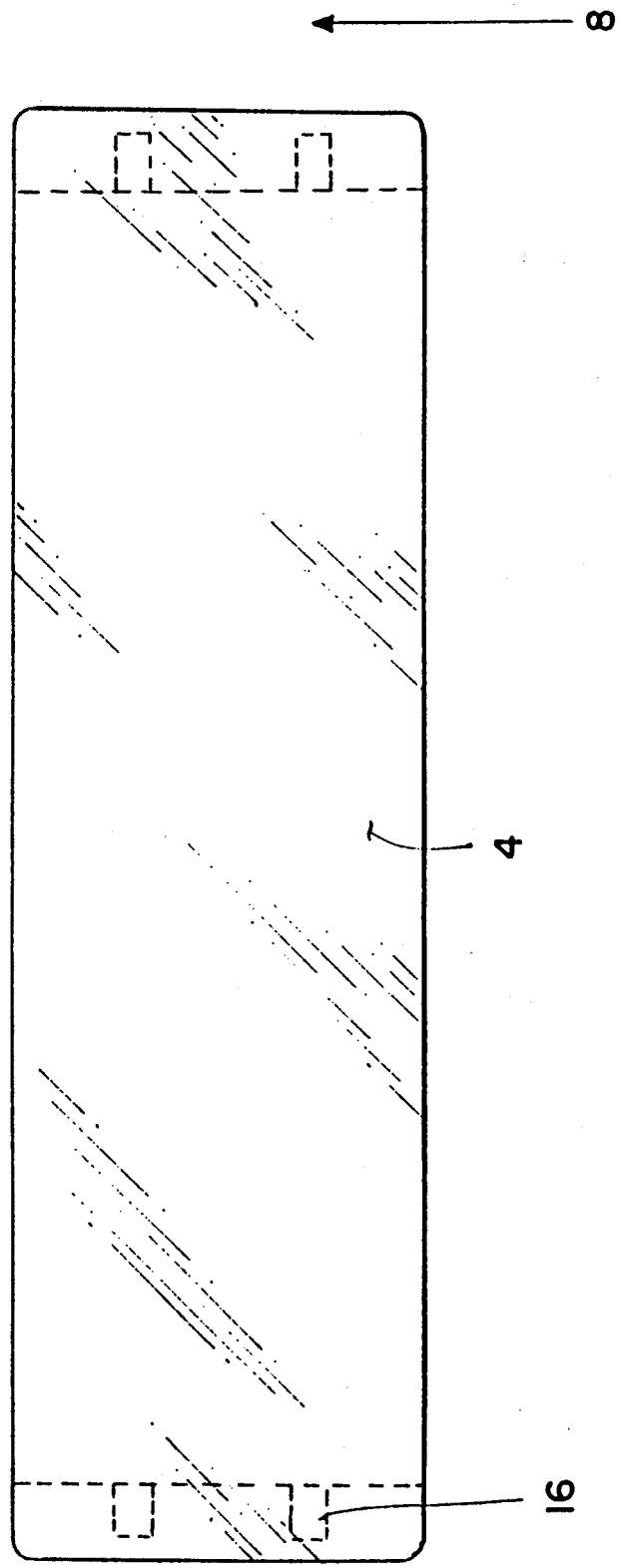
FIG. 2 is a top view of a porous slab mounted inside a cavity forming a plenum chamber.

Referring to FIGS. 1 and 2, a slab of porous material (4) is provided. The porosity of this material should be between 4% and 25% and may or may not be evenly distributed. This material is designed to have the minimal thickness necessary to withstand the difference between the air pressure inside the plenum chamber (10) and that outside the plenum chamber (10). This slab (4) has the same length and width measurements as the cavity (2). A means to mount (16) the slab (4) inside the cavity (2) a small distance above the floor (14) of the cavity (2) is provided. This means may include slight modifications to the slab (4) itself and may involve suspending, attaching, affixing, etc. the slab (4) inside the cavity (2). The plenum chamber (10) between the slab (4) and the floor (14) must be deep enough to allow air to flow freely. However, because the area outside the plenum chamber (10) is used for storage purposes, the plenum chamber (10) must be designed to be as shallow as possible. A deep plenum chamber (10) does not affect the usefulness of this invention, it only affects the amount of storage space left in the cavity (2). The slab (4) may be mounted in any fashion as long as the airflow through the plenum chamber (10) is not blocked and the slab (4) is held firmly in place.

Figure 4:
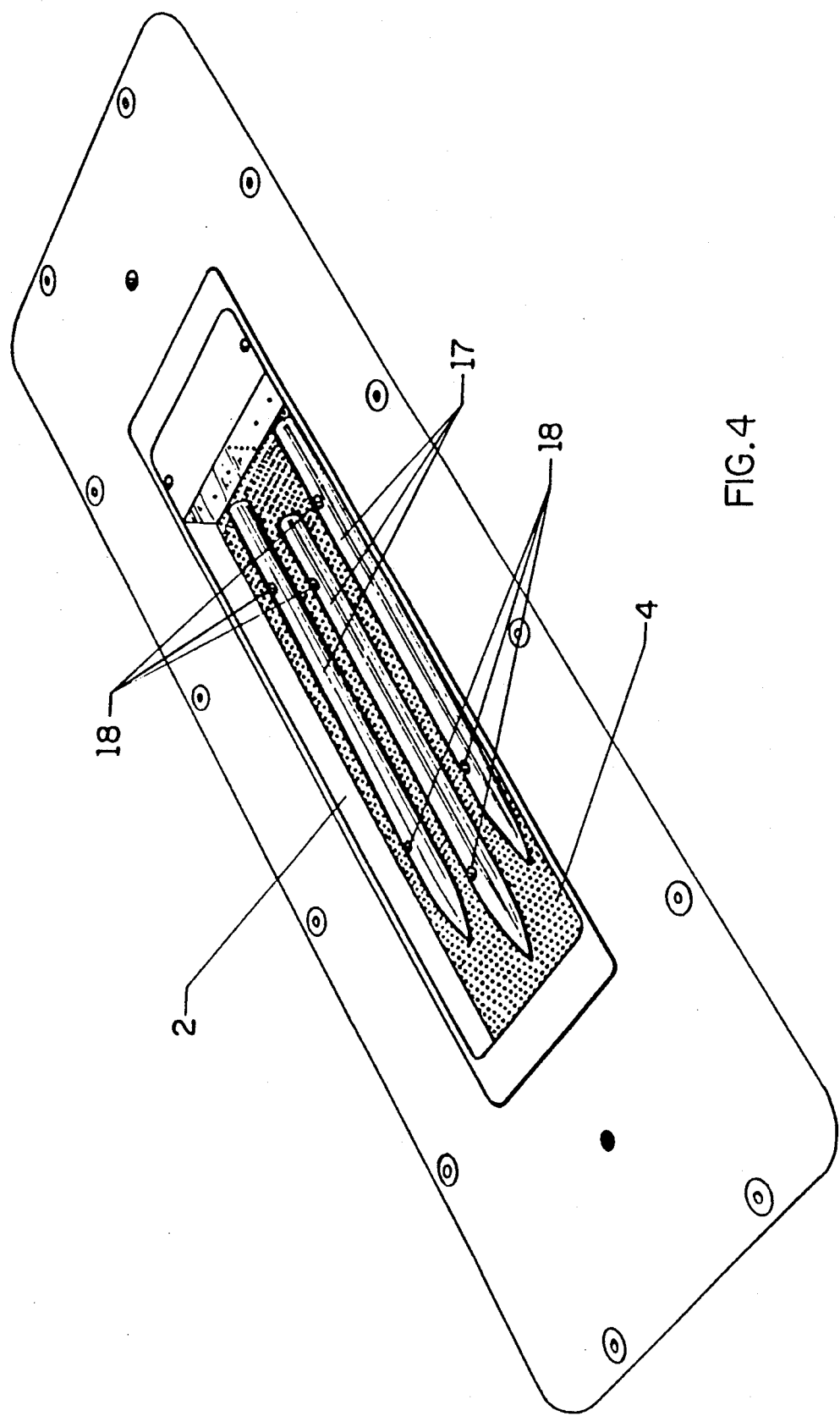
FIG. 4 is a perspective view showing the cavity and porous slab of FIG. 2 with generic stores mounted therein.

This slab (4) allows air to flow in the direction opposite (12) to the air flow on the surface of the aircraft (6). This is important in shallow cavities because during supersonic flight, a high pressure area is formed at the rear of a shallow cavity and a low pressure area is formed at the front. In shallow cavities, these two areas are too distant to allow the air in the high pressure area to flow to the low pressure area. This causes "closed cavity flow" which results in increased drag and store separation difficulties. Shallow cavities which have a porous floor exhibit characteristics of "open cavity flow" such as reduced drag and an improvement in store separation characteristics. Referring now to FIG. 4, there is shown cavity 2, porous slab 4, and generic stores 17, which are mounted for retention in cavity 2 and subsequent release therefrom by means of mounting means 18.

EXAMPLE

A small scale model of this invention has been tested in a wind tunnel. Cavities having a length to height ratio between 4 and 17.5 were used with the most beneficial results occurring in those greater than 12. The cavity height was 0.40 inches and the length ranged from 1.6 inches to 7.0 inches. Tests were conducted at Mach numbers ranging from 1.60 to 2.86; differing Mach numbers had no apparent effect on the results. Two different porous materials were tested, having porosities of 7.8% and 11%, again with no apparent effect. The material used was a flat metal plate, 0.10 inches thick, in which holes of either 0.021 or 0.025 in. diameter were drilled. The diameter of the holes drilled depended on the desired porosity. Two different plenum chamber depths were tested, 0.30 inches and 0.15 inches. Varying the depth of the chamber did not appreciably affect the results.

Figure 3:
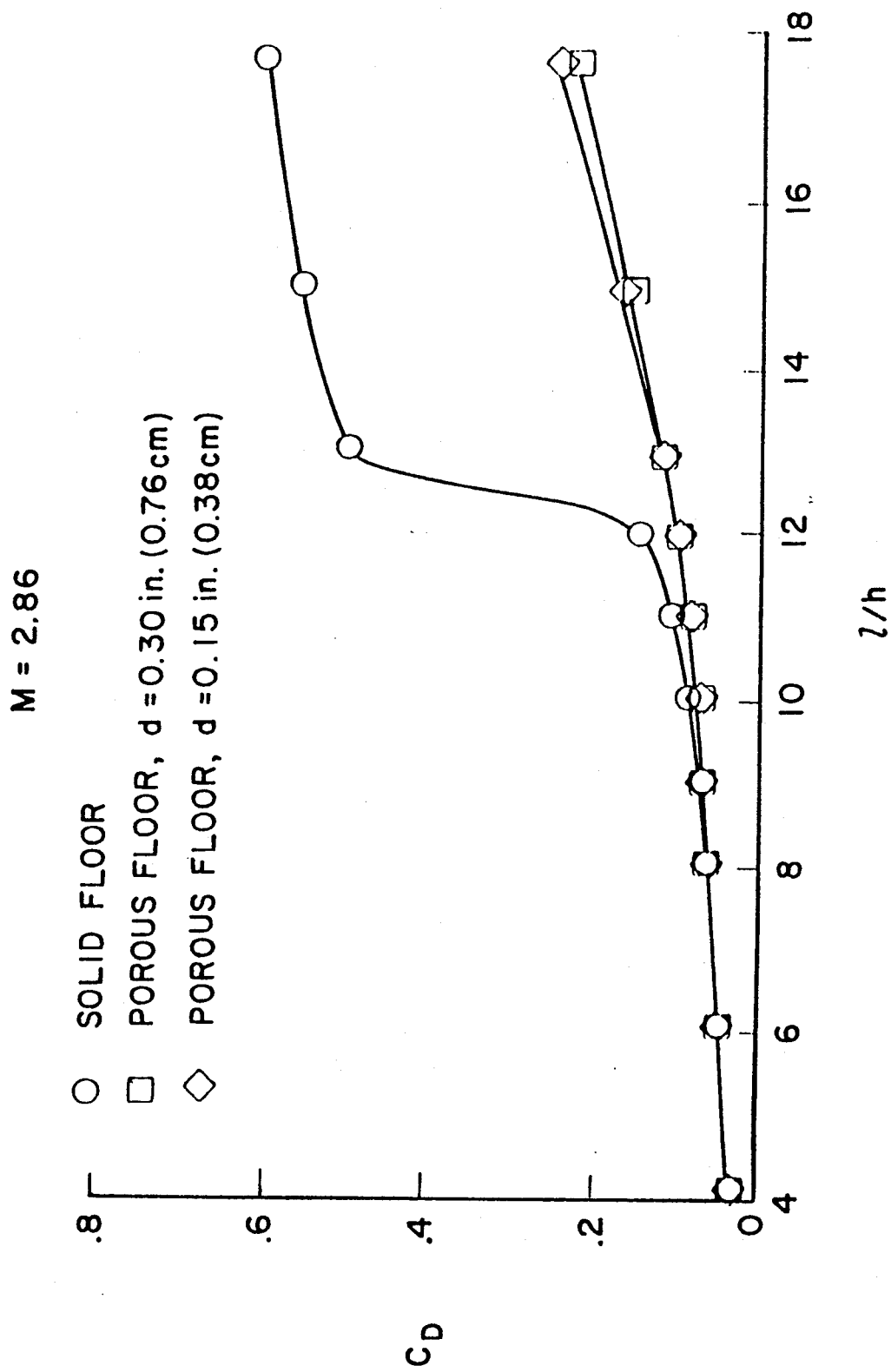
FIG. 3 is a graph showing the effect of a porous floor in shallow cavities on the coefficient of drag, results shown are for M=2.86.

FIG. 3 is a graph of the results of these tests which show a dramatic difference in coefficient of drag between a cavity with a solid floor and one with a porous floor for cavities with a length to height ratio greater than 12. A slight difference was shown for length to height ratios between 9 and 12 and essentially no difference for those less than 9. These tests indicate that the transition from open cavity flow to closed cavity flow occurs when the length to height ratio is approximately 12. Cavities having a length to height ratio less than 12 exhibit open cavity flow while those greater than 12 exhibit closed cavity flow.

What is claimed is:

1. A device for reducing drag and store separation difficulties caused by shallow cavities recessed below the surface of aircraft in supersonic flight which comprises:
   a. a shallow cavity, which is defined as one having a length to height ratio greater than about 9 and has four walls recessed below the aircraft surface,
   b. a slab of porous material with porosity between 4 and 25% cut to fit precisely inside the cavity where the slab is thick enough to withstand a pressure difference on either major side of the slab and thin enough not to obstruct free flow of air through the slab,
   c. a means to mount the slab in the cavity creating a plenum chamber between the slab and the floor of the cavity such that:
      (1) airflow through the plenum chamber is not blocked,
      (2) the plenum chamber formed is deep enough to allow air to flow freely therethrough, and
      (3) the plenum chamber formed is shallow enough that storage space is maximized,
   d. a means to mount stores within the cavity such that when the stores are released, they will separate from the cavity.

2. A device according to claim 1 where the shallow cavity is defined as one having a length to height ratio greater than about 12.

* * * * *